US012658448B2

(12) United States Patent
Benck et al.

(10) Patent No.: US 12,658,448 B2
(45) Date of Patent: Jun. 16, 2026

(54) ELECTROLYTE ENGINEERING METHODS AND SYSTEMS

(71) Applicant: L3Harris Open Water Power, Inc., Somerville, MA (US)

(72) Inventors: Jesse Daniel Benck, Cambridge, MA (US); Andrew Crampton, Arlington, MA (US); Jason Kovacs, Somerville, MA (US); Mariya Layurova, Cambridge, MA (US); Ian Salmon McKay, Seattle, WA (US); Matthew Diego Rail, Somerville, MA (US); William Stinson, Somerville, MA (US); Branko Zugic, Somerville, MA (US)

(73) Assignee: L3Harris Open Water Power, Inc., Somerville, MA (US)

( * ) Notice: Subject to any disclaimer, the term of this patent is extended or adjusted under 35 U.S.C. 154(b) by 494 days.

(21) Appl. No.: 17/789,950

(22) PCT Filed: Jan. 6, 2021

(86) PCT No.: PCT/US2021/012285
§ 371 (c)(1),
(2) Date: Jun. 29, 2022

(87) PCT Pub. No.: WO2021/141972
PCT Pub. Date: Jul. 15, 2021

(65) Prior Publication Data
US 2023/0064065 A1 Mar. 2, 2023

Related U.S. Application Data

(60) Provisional application No. 62/957,407, filed on Jan. 6, 2020.

(51) Int. Cl.
*H01M 4/62* (2006.01)
*H01M 6/04* (2006.01)
*H01M 4/02* (2006.01)

(52) U.S. Cl.
CPC ........... *H01M 4/628* (2013.01); *H01M 6/045* (2013.01); *H01M 2004/027* (2013.01); *H01M 2300/0014* (2013.01)

(58) Field of Classification Search
CPC .............................. H01M 4/628; H01M 6/045
See application file for complete search history.

(56) References Cited

U.S. PATENT DOCUMENTS 10,135,076 B1 * 11/2018 Liu ...................... A61B 5/6821
2008/0280211 A1 * 11/2008 Lee ...................... H01M 10/052
429/344
(Continued)

FOREIGN PATENT DOCUMENTS

EP 2605329 A1 6/2013
EP 3156518 A1 * 4/2017 ............. C09D 5/086
(Continued)

OTHER PUBLICATIONS

Azooz, R. E. (2016). EDTA as a corrosion inhibitor for Al in 0.5 M HCI: adsorption, thermodynamic and theoretical study. Journal of Electrochemical Science and Engineering, 6(3), 235-251. https://doi.org/10.5599/jese.300 (Year: 2016).*
(Continued)

*Primary Examiner* — Nicholas A Smith
*Assistant Examiner* — Ziheng Lu
(74) *Attorney, Agent, or Firm* — Danielson Legal LLC

(57) ABSTRACT

An electrochemical system, the system including an aqueous electrolyte, at least one chelating agent configured to bind to at least one detrimental ionic species, and a particulate precipitation site. A method of forming an electrochemical
(Continued)

Time Coordinate (t or A·hr)

system including creating a housing with an interior volume, placing at least one electrode within the interior volume, adding at least one chelating agent configured to bind to at least one detrimental ionic species into the interior volume, and adding a particulate precipitation site to the interior volume.

19 Claims, 16 Drawing Sheets

(56) References Cited

U.S. PATENT DOCUMENTS

| | | | | |
|---|---|---|---|---|
| 2013/0202954 | A1* | 8/2013 | Suzuki | H01M 4/38 |
| | | | | 429/188 |
| 2014/0113206 | A1* | 4/2014 | Friesen | H01M 4/42 |
| | | | | 429/405 |
| 2018/0021226 | A1 | 1/2018 | De Miguel et al. | |
| 2018/0069283 | A1 | 3/2018 | Lamaka | |
| 2018/0212263 | A1 | 7/2018 | Kovacs et al. | |
| 2020/0091561 | A1* | 3/2020 | McIntyre | H01M 10/0459 |
| 2021/0336262 | A1* | 10/2021 | Liu | C01G 45/1221 |

FOREIGN PATENT DOCUMENTS

| | | |
|---|---|---|
| JP | 2019-505979 A | 2/2019 |
| JP | 2018-037410 A | 9/2021 |

OTHER PUBLICATIONS

Wysocka et al., "Carboxylic acids as efficient corrosion inhibitors of aluminium alloys in alkaline media", 2018, Electrochimica Acta, 289, 175-192, https://doi.org/10.1016/j.electacta.2018.08.070 (Year: 2018).*

Zakiszak, Carboxyl groups of citric acid in the process of complex formation with bivalent and trivalent metal ions in biological systems, 2018, Journal of Inorganic Biochemistry, 37-47, https://doi.org/10.1016/j.jinorgbio.2018.01.017 (Year: 2018).*

Alchem, How Does Sodium Hexametaphosphate Tech Grade Chelate Metal Ions?, 2025, https://www.alchembio.com/blog/how-does-sodium-hexametaphosphate-tech-grade-chelate-metal-ions-151653.html (Year: 2025).*

Chemate, Sodium Hexametaphosphate Uses in Water Treatment, 2025, https://chematephosphates.com/sodium-hexametaphosphate-uses-in-water-treatment/ (Year: 2025).*

International Search Report for PCT/US2021/012285, Mar. 19, 2021, 2 pgs.

Written Opinion for PCT/US2021/012285, Mar. 19, 2021, 8 pgs.

Extended European search report for European Pat. Appl. No. 21738073.2, dated Dec. 9, 2024, 5 pgs.

Notice of refusal from for Japanese Pat. Appl. No. 2022-541220, dated Jan. 7, 2025, 2 pgs.

Examination report No. 1 for Australian Pat. Appl. No. 2021205838, Oct. 20, 2025, 4 pgs.

Examination report No. 2 for Australian Pat. Appl. No. 2021205838, Dec. 23, 2025, 4 pgs.

* cited by examiner

| SPECIES NAME | FORMULA |
|---|---|
| Gibbsite | $Al(OH)_3$ |
| Bayerite | $Al(OH)_3$ |
| Boehmite | $AlO(OH)$ |
| Amorphous Aluminum Hydroxide | $Al(OH)_3$ |
| Magnesium Hydroxide | $Mg(OH)_2$ |
| Calcium Hydroxide | $Ca(OH)_2$ |
| Calcium Oxide | $CaO$ |
| Alumina | $Al_2O_3$ |
| Silica | $SiO_2$ |
| Fumed Silica | $SiO_2$ |
| Iron (II) Hydroxide | $Fe(OH)_2$ |
| Iron (III) Hydroxide | $Fe(OH)_3$ |
| Iron (II,III) Oxide (Magnetite) | $Fe_3O_4$ |
| Manganese Hydroxide | $Mn(OH)_2$ |
| Nickel Hydroxide | $Ni(OH)_2$ |
| Cobalt Hydroxide | $Co(OH)_2$ |
| Mg-Fe Hydroxide (LDH) | $Mg_5Fe(OH)_{13}$, $Mg_5Fe_2(OH)_{16}$ |
| Ca-Fe Hydroxide (LDH) | $Ca_5Fe(OH)_{13}$, $Ca_5Fe_2(OH)_{16}$ |
| Co-Fe Hydroxide (LDH) | $Co_5Fe(OH)_{13}$ |
| Mn-Fe Hydroxide (LDH) | $Mn_5Fe(OH)_{13}$ |
| Ni-Fe Hydroxide (LDH) | $Ni_5Fe(OH)_{13}$ |

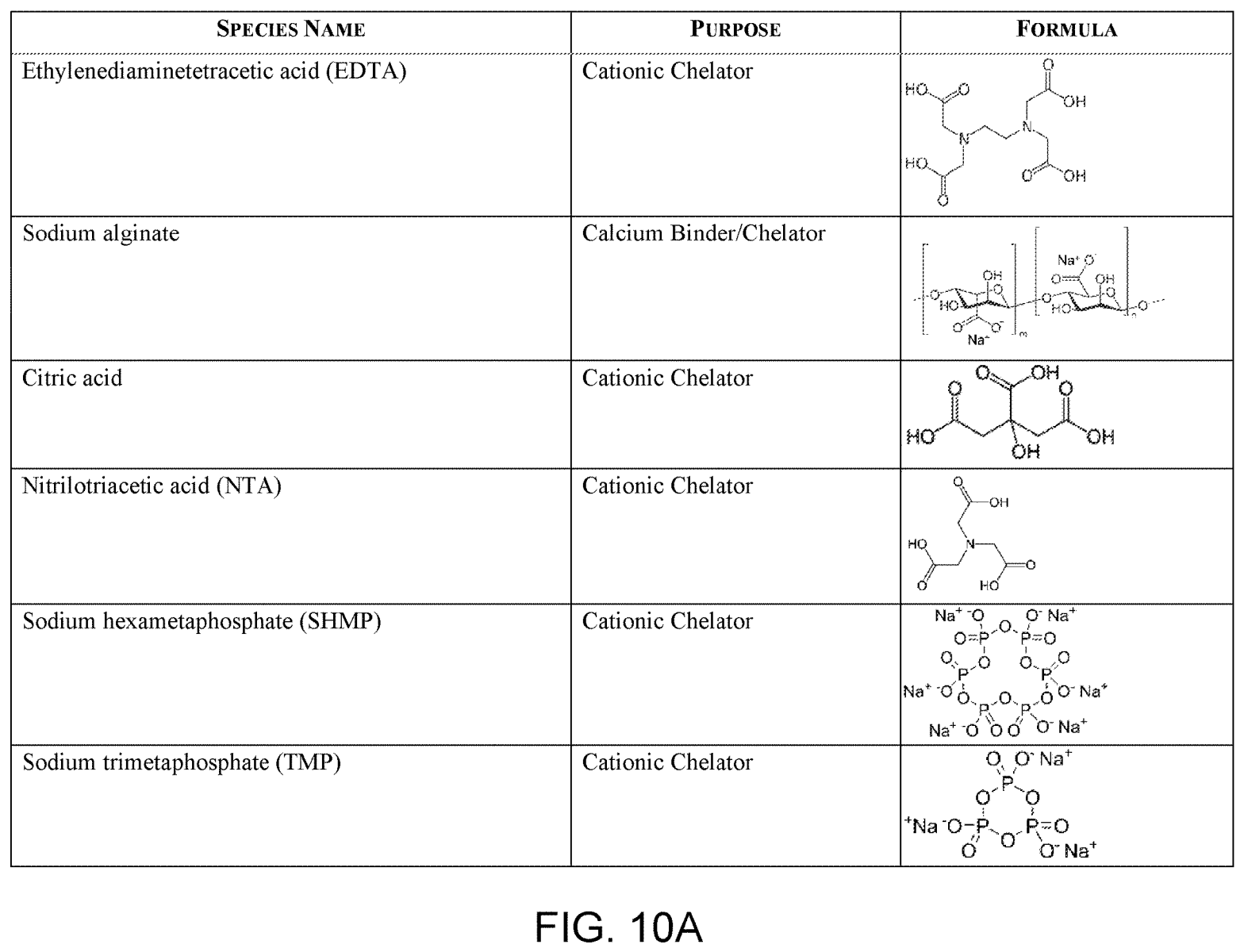

| SPECIES NAME | PURPOSE | FORMULA |
|---|---|---|
| Ethylenediaminetetraacetic acid (EDTA) | Cationic Chelator | |
| Sodium alginate | Calcium Binder/Chelator | |
| Citric acid | Cationic Chelator | |
| Nitrilotriacetic acid (NTA) | Cationic Chelator | |
| Sodium hexametaphosphate (SHMP) | Cationic Chelator | |
| Sodium trimetaphosphate (TMP) | Cationic Chelator | |

FIG. 10A

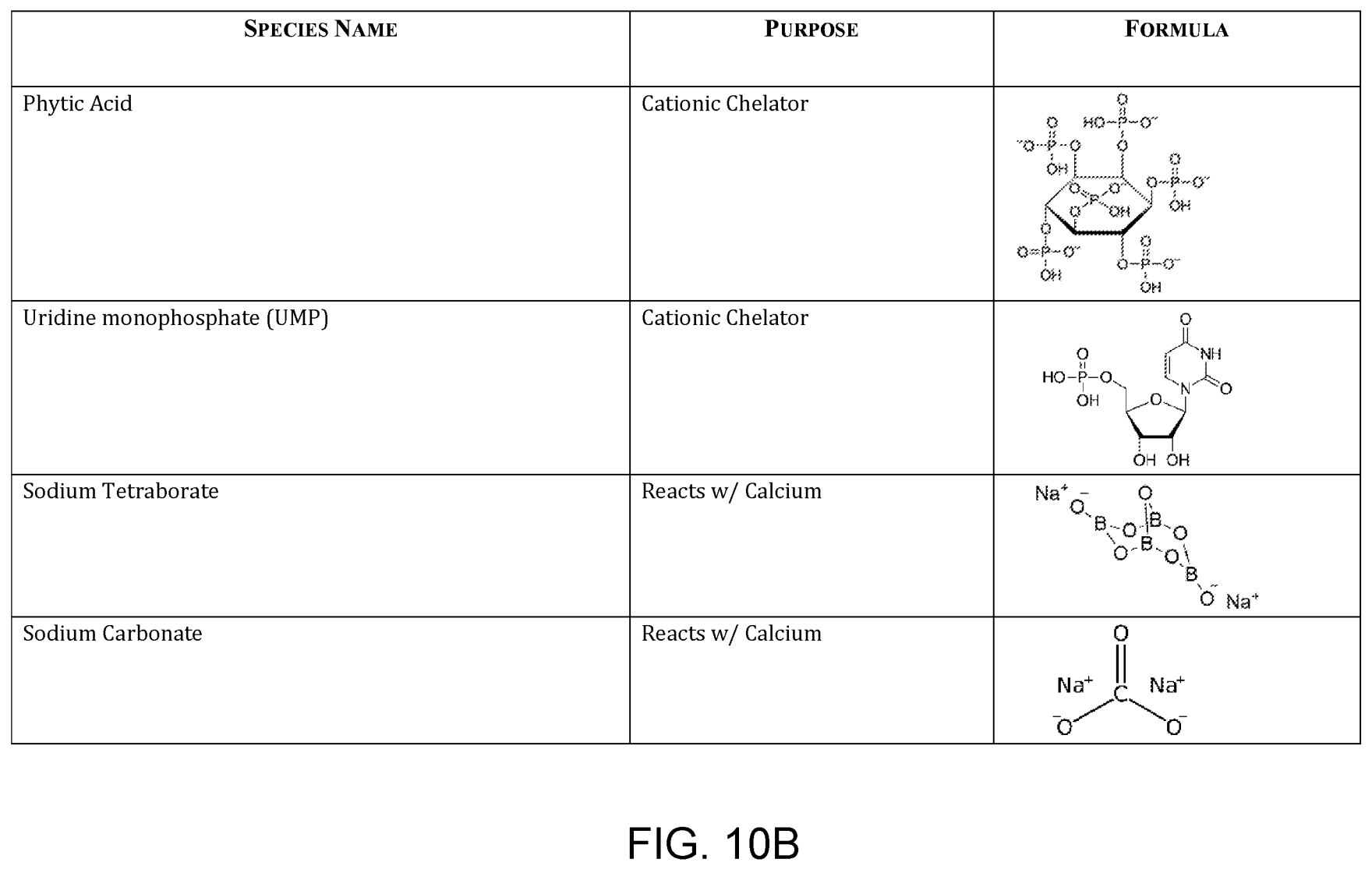

| SPECIES NAME | PURPOSE | FORMULA |
|---|---|---|
| Phytic Acid | Cationic Chelator | |
| Uridine monophosphate (UMP) | Cationic Chelator | |
| Sodium Tetraborate | Reacts w/ Calcium | |
| Sodium Carbonate | Reacts w/ Calcium | |

FIG. 10B

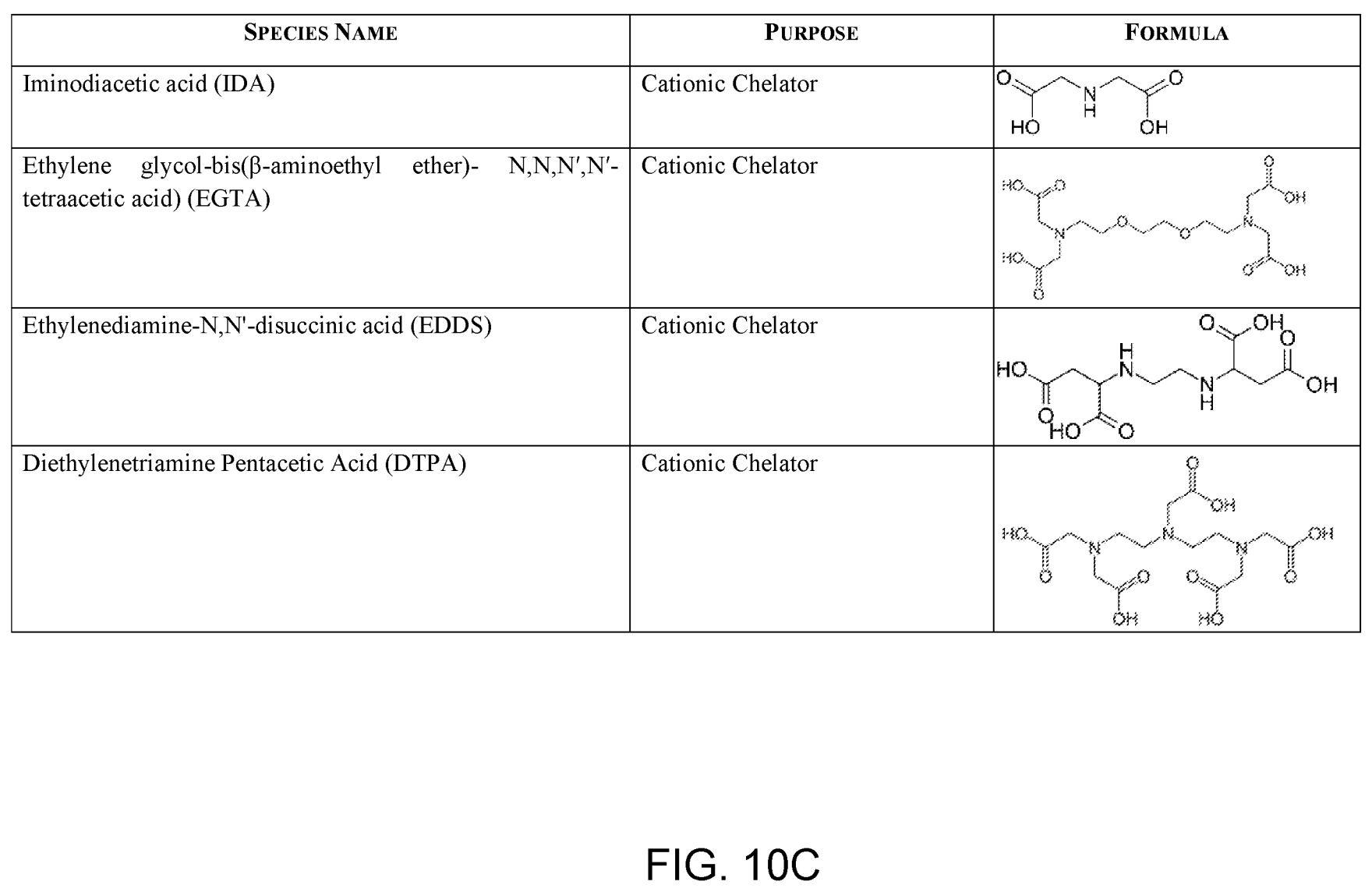

| Species Name | Purpose | Formula |
|---|---|---|
| Iminodiacetic acid (IDA) | Cationic Chelator | |
| Ethylene glycol-bis(β-aminoethyl ether)- N,N,N',N'-tetraacetic acid) (EGTA) | Cationic Chelator | |
| Ethylenediamine-N,N'-disuccinic acid (EDDS) | Cationic Chelator | |
| Diethylenetriamine Pentacetic Acid (DTPA) | Cationic Chelator | |

FIG. 10C

ELECTROLYTE ENGINEERING METHODS AND SYSTEMS

CROSS REFERENCE TO RELATED APPLICATIONS

The present application is a national phase application of International (PCT) Patent Appl. No. PCT/US2021/012285, filed internationally on Jan. 6, 2021, and claims the benefit of and priority to U.S. Prov. Appl. No. 62/957,407, filed on Jan. 6, 2020, the entire disclosure of each of which is incorporated by reference as if set forth in their entirety herein.

TECHNICAL FIELD

Embodiments described herein generally relate to electrochemical systems with aqueous electrolytes, and more particularly to electrochemical systems and methods configured to use a particulate precipitation site in combination with at least one chelating agent to bind to a detrimental ionic species.

BACKGROUND

Power sources such as metal-water cells have become a popular alternative energy source for underwater applications. These types of cells generally include a hydrogen-evolving cathode that splits water according to the reaction $2H_2O \rightarrow H_2 + 2OH^-$. The hydroxide ions are then used to react with metallic material such as aluminum. Cells may be discharged at constant voltage or constant power, or under other load profiles, and the type and amount of discharge may affect the general pattern described herein.

Metal-water electrochemical cells, such as aluminum-water cells, with aqueous electrolytes have a breaking-in period where, due to several factors, the cell performance decreases and recovers in a predictable fashion. When the cell is run under constant voltage, this effect is manifested as a decrease in current output of the cell, proportionately lowering the power output. After this induction period, the cell may reach a steady state operation for most of the discharge. This behavior poses a design challenge: either 1) the user must be comfortable with a mission profile that includes a period of low power output during startup, or 2) the battery system needs to be designed to meet minimum discharge specs at the lowest performance point in the transitional period, which may result in a poorly fit system for long-term steady-state discharge.

The maximum current output of an aluminum-water cell is typically limited by the corrosion rate of aluminum, which is a function of several variables including the hydroxide concentration of the electrolyte. Aluminate ($Al(OH)_4^-$) binds an additional hydroxyl group over the final waste product ($Al(OH)_3$), reducing the hydroxyl concentration. As aluminate builds up in solution, the hydroxyl concentration and the current output decreases. This trend reverses when aluminum hydroxide begins to precipitate out of the electrolyte at an appreciable rate, replenishing the hydroxyl concentration. There are several mechanisms through which the precipitation reaction may occur, including precipitating heterogeneously on a substrate or on solid particles in the electrolyte, or the aluminate can nucleate in solution to form aluminum hydroxide particles. A steady state discharge may be reached when the aluminate production rate from the electrochemical reactions is approximately equal to the precipitation rate of aluminate into aluminum hydroxide, and other factors are held constant (such as the temperature and water injection to replenish consumed water).

Power sources may be used in fresh water, salt water, brackish water, or any combination thereof. Some power sources may be used in impure water and the precipitation process can be complicated by the presence of certain ionic species, such as but not limited to $Si^{4+}$, $Mg^{2+}$, $Ca^{2+}$, $Sr^{2+}$, $Fe^{2+}$, and $Fe^{3+}$.

Existing power sources may be susceptible to fouling, or occlusion of the active electrode surface area. Fouling may occur by the ambient metal ions or other particulates in the water. There are multiple mechanisms through which these ions may interact with the system, including interacting with aluminate in a way that prevents it from precipitating. These ions may be present in some concentration when water from environmental sources is used as a component in the electrolyte mixture, either as part of the initial fill or due to periodic replenishment. Water from environmental sources is a term meant to include all forms of surface and subterranean water, such as seawater, freshwater sources such as rivers and lakes, brackish water sources such as that from bogs, marshes, or stagnant ponds, industrial or agricultural runoff, etc.

A need exists, therefore, for methods and devices that overcome the disadvantages of existing power sources.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

According to one aspect, embodiments relate to an electrochemical system. In some embodiments, the electrochemical system includes an aqueous electrolyte; at least one chelating agent configured to bind to at least one detrimental ionic species; and a particulate precipitation site.

In some embodiments, the particulate precipitation site is suspended in the aqueous electrolyte.

In some embodiments, the electrochemical system is a metal-water system.

In some embodiments, the electrochemical system is a metal-oxygen system.

In some embodiments, the chelating agent is a corrosion inhibitor for an anode in the electrochemical system.

In some embodiments, the particulate precipitation site includes aluminum hydroxide, silicon dioxide, aluminum oxide, aluminum oxy-hydroxide, Boehmite, sodium aluminate, calcium oxide, aluminum potassium sulfate, aluminum ammonium sulfate, or dissolved aluminum species.

In some embodiments, the chelating agent is configured to selectively coordinate at least one dissolved species in the aqueous electrolyte.

In some embodiments, the aqueous electrolyte includes at least one of potassium hydroxide, sodium hydroxide, lithium hydroxide, seawater, fresh water, brackish water, or any combination thereof.

In some embodiments, the at least one detrimental ionic species comprises at least one of $Ca^{2+}$, $Mg^{2+}$, $Fe^{2+}$, or $Fe^{3+}$.

In some embodiments, the particulate precipitation site is a nucleation site.

In another aspect, embodiments relate to a method of forming an electrochemical system. In some embodiments, the method includes creating a housing with an interior volume; placing at least one electrode within the interior volume; adding, into the interior volume, at least one chelating agent configured to bind to at least one detrimental ionic species; and adding a particulate precipitation site to the interior volume.

In some embodiments, the method further includes adding an electrolyte to the interior volume.

In some embodiments, adding the electrolyte to the interior volume includes at least partially submerging the housing into a water containing liquid.

In some embodiments, the particulate precipitation site is either suspended or dissolved in an aqueous electrolyte.

In some embodiments, the aqueous electrolyte includes at least one of potassium hydroxide, sodium hydroxide, lithium hydroxide, seawater, fresh water, brackish water, or any combination thereof.

In some embodiments, the electrochemical system is a metal-water system.

In some embodiments, the chelating agent is a corrosion inhibitor for an anode in the electrochemical system.

In some embodiments, the chelating agent is configured to selectively coordinate at least one dissolved species in an aqueous electrolyte within the housing.

In some embodiments, the at least one detrimental ionic species comprises at least one of $Ca^{2+}$, $Mg^{2+}$, $Fe^{2+}$, or $Fe^{3+}$.

In some embodiments, the electrode includes at least one of an aluminum anode, a lithium anode, a magnesium anode, a zinc anode, or an iron anode.

BRIEF DESCRIPTION OF DRAWINGS

Non-limiting embodiments of the present invention will be described by way of example with reference to the accompanying FIGS., which are schematic and are not intended to be drawn to scale. In the FIGS., each identical or nearly identical component illustrated is typically represented by a single numeral. For purposes of clarity, not every component is labeled in every FIG., nor is every component of each embodiment of the invention shown where illustration is not necessary to allow those of ordinary skill in the art to understand the invention. In the FIGS.:

FIG. 3 shows a table of preload candidates in accordance with one embodiment;

FIG. 6 shows a chelating agent complexing with $Ca^{2+}$ in accordance with one embodiment;

FIGS. 10A, 10B, and 10C show tables of chelator candidates investigated in accordance with one embodiment;

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Figure 1:
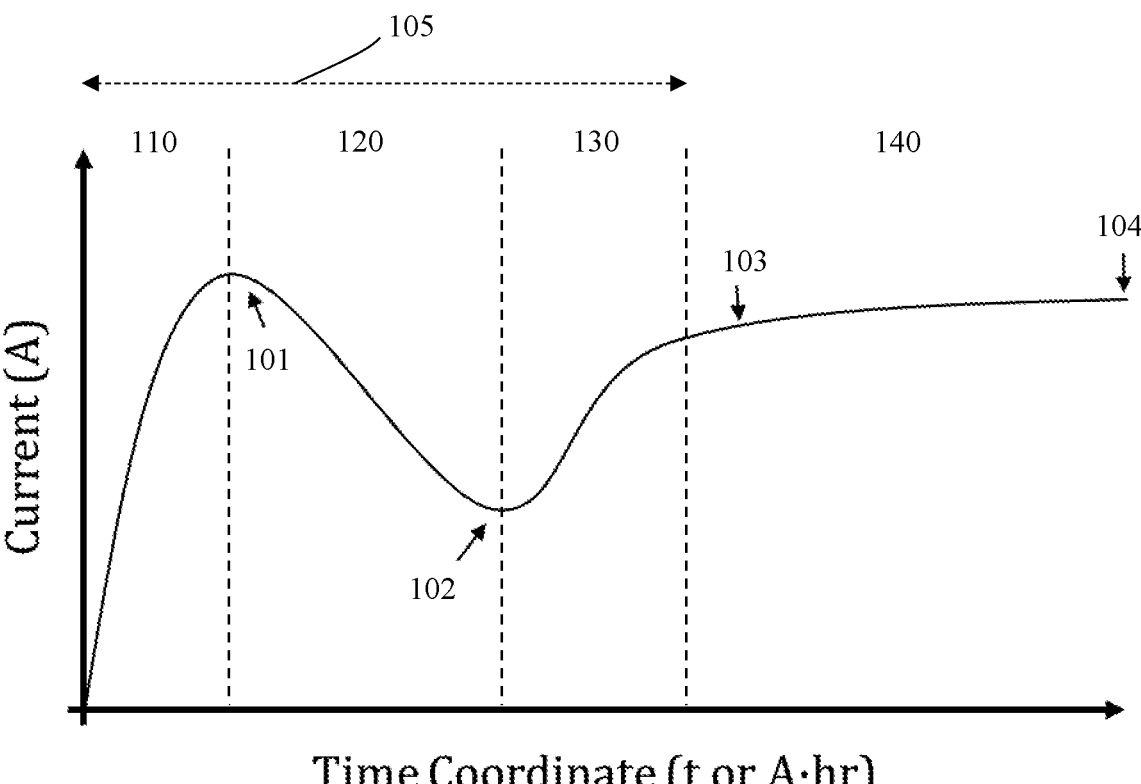
FIG. 1 shows a graph of a typical electrochemical discharge at constant voltage and at constant temperature for an aluminum-water electrochemical cell.

FIG. 1 shows a graph of a typical electrochemical discharge at constant voltage and at constant temperature for an aluminum-water electrochemical cell. The typical current changes over time, marked on the x-axis of the graph as Time Coordinate, in four distinct time periods. These time periods comprise a pre-transition peak 101, a transition trough 102, a recovery point 103, and a post-transition peak 104. Although the ratio of pre-transition peak 101 and post-transition peak 104 is approximately 1:1 in FIG. 1, the ratio depends on the specific discharge condition and the electrode materials selected. In some aluminum-water electrochemical cells, a typical discharge may have pre transition peak 101 to post transition peak 104 ratio of greater than 1:1, less than 1:1, or approximately equal to 1:1

The first time period 110 comprises the time from startup to the pre-transition peak 101. During the cell startup, the anode surface may roughen, and the current output of the cell may increase over time. This may be referred to as the startup period or a transient starting state of the discharge.

The second time period 120 is the start of a transition event and spans from pre-transition peak 101 to transition trough 102. In an aluminum-water cell, buildup of aluminate byproduct increases without enough precipitation to offset it. This reduces the hydroxyl concentration of the aluminum-water cell and the current output begins to decline.

The third time period 130 is the recovery period of the transition event and spans from the transition trough 102 to the recovery point 103. Once the aluminate concentration is sufficiently high to favor the kinetics of one of several precipitation reactions, the aluminate begins to crash out of the solution as aluminum hydroxide. This frees hydroxyl groups from the aluminate molecules, increasing the hydroxide concentration and increasing the current output. There are different reaction kinetics for aluminum hydroxide nucleation and growth on existing particles or surfaces, so the shape of this part of the graph may vary based on which reaction kinetics are favored.

The fourth time period 140, or the steady-state region, spans from the recovery point 103 to the post-transition peak 104. Once these reactions reach an equilibrium, the cell will approach a steady-state output where the current output at constant voltage is nearly constant. The point at which the electrochemical reaction, which generates aluminate, equilibrates with the aluminate precipitation reactions and the current output stabilizes marks the recovery point.

The induction period 105, or the breaking-in period, spans from the startup to the recovery point and is the entire pre-steady-state region.

In some aluminum-water cells, the pre-transition peak 101 is the maximum current output observed before the buildup of the aluminate byproduct begins to reduce the output of the aluminum-water cell. In some aluminum cells, the pre-transition peak 101 may not be the time at which the anode surface is fully roughened. In most aluminum-water cells, the anode surface may continue to roughen through the recovery point 103. In the literature, the pre-transition peak 101 is often reported as the maximum output for a given alloy or cathode composition because the cell may use a large enough reservoir of electrolyte so that the transitional behavior of the second and third time periods do not occur.

In some aluminum-water cells, the transition trough 102 is the lowest part of the induction period. The transition trough 102 is the output of the aluminum-water cell at the lowest hydroxide concentration induced by the pre-steady-state reaction kinetics.

After the third time period, further stabilization from both 1) water consumption that slowly increases the hydroxide concentration and 2) slow shifts in experimental conditions will cause a post-equilibrium peak power in the fourth time period that will be slightly greater than what was observed immediately after the recovery period 130. In some embodiments, the water consumption is due to the water reduction reaction at the cathode. In some embodiments, the water consumption may be due to self-corrosion at the anode.

To improve performance, some embodiments increase the minimum current density throughout the transitional induction period, such that the pre-transition peak 101, the transition trough 102, and the post-transition steady state 104 approach the same value. In some embodiments, this improved system performance is called dampening. In a fully dampened metal-water cell, the current value of the pre-transition peak 101, the transition trough 102, and the post-transition steady state 104 are equal, such that there is no transition trough 102.

To control the breaking-in period, embodiments may either accelerate through the period or dampen the effect of the period, such that engineers may appropriately size the battery system.

In some embodiments, a chemical agent is added to the electrolyte of an electrochemical system, such as a metal-water cell. The chemical agent may include additives, such as aluminate or other substances, configured to accelerate the precipitation reaction of the system. In some embodiments, this may be a precipitation-inducing site referred to as a preload. In some embodiments, a preload or preload material may comprise a solid material, such as aluminum hydroxide and may be configured to act as a nucleation site or a preferential precipitation site.

In some embodiments, the chemical agent may include additives configured to preferentially bind to detrimental chemical species present in the electrolyte, removing them so that precipitation can occur. In some embodiments, this type of chemical agent may be a chelator. In some embodiments, a combination of at least one chelator and at least one preload may be added to an electrochemical system.

In some embodiments, the system may include an electrolyte that is not expected to contain a detrimental set of chemical species, such as those comprised from certain freshwater sources. In some embodiments, systems not expected to contain a detrimental set of chemical species may only use a preload and not a chelator to accelerate the break-in period and rapidly equilibrate the system. In some embodiments, such as when the electrolyte is comprised of seawater, a combination of a chelator and a preload may achieve a similar effect. Optimized combinations of the preload and chelator may be based on the environmental factors the system is intended to operate in and the water quality.

In some embodiments, a preload comprises an aluminum-containing additive. In some embodiments, the preload may be introduced to the electrolyte of an aluminum-water electrochemical cell. In some embodiments, the preload may be solid particles of aluminum hydroxides, aluminum oxides, chemical species such as sodium aluminate or potassium aluminate that dissolve in the electrolyte, or any combinations thereof. In some metal-water cells, a preload may comprise a metal-containing additive matching the metal-water cell. For example, in some embodiments, if the cell was an iron-water cell, the preload may comprise an iron-containing additive. In some embodiments, the preload may comprise a metal-containing additive that does not match the metal-water cell. For example, in some embodiments, if the cell was an aluminum-water cell, the preload may comprise a magnesium-containing additive.

In some embodiments, the preload may enable partial dissolution of the aluminum species in the electrolyte, which increases the initial aluminate concentration in the electrolyte. This increase causes the electrolyte to become saturated with aluminate more quickly than in the standard reaction shown in FIG. 1. In some embodiments, the solid remainder present in the electrolyte may serve as nucleation sites for the precipitation aluminum reaction, causing the reaction to occur at lower aluminate concentrations. In some embodiments, the solid remainder may act as a seed crystal for a precipitation aluminum reaction.

In some embodiments, the combination of a rapid saturation of aluminate and the solid remainder present in the electrolyte may shorten the induction period and allow the electrochemical system to reach the recovery point more quickly. In some embodiments, the rapid saturation of a metal, such as aluminate, may be the primary mechanism to reach a quick recovery point. In some embodiments, the amount of solid remainder present in the electrolyte may be the primary mechanism to reach a quick recovery point. In some embodiments using a highly soluble species as the preload, the rapid saturation of a metal may primarily be responsible for shortening the induction period of the electrochemical cell. In some embodiments using a less soluble particulate as the preload, the amount of solid remainder present in the electrolyte may primarily be responsible for shortening the induction period of the electrochemical cell.

In some embodiments, and unlike batchwise processes, an aluminum-water battery continually generates aluminate and precipitates aluminum hydroxide. Unlike in industrial processes where temperatures may be imposed in excess of 100° C., these batteries may function in environments where temperature control is largely passive instead of a variable to be used to force precipitation. In some embodiments, the batteries may function in natural environmental seawater, brackish water, freshwater, or any combination thereof. Some embodiments may serve as a galvanic cell that provides electrical power.

Figure 2:
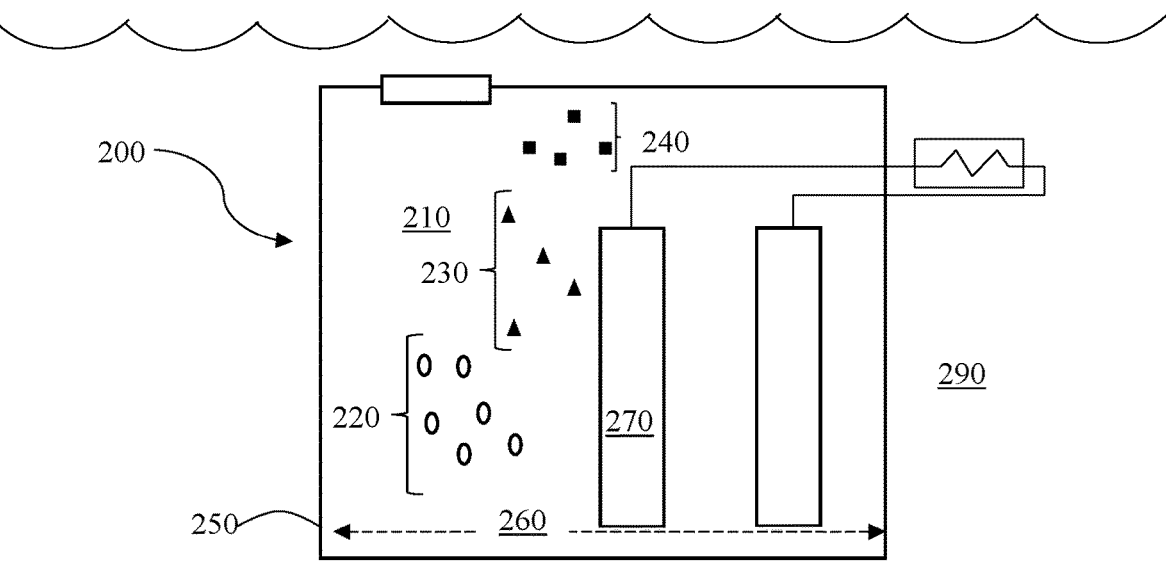
FIG. 2 shows an electrochemical system in accordance with one embodiment.

FIG. 2 shows an electrochemical system 200 in accordance with one embodiment. In some embodiments, the electrochemical system 200 may include an aqueous electrolyte 210, at least one chelating agent 220 configured to bind to at least one detrimental ionic species, and a particulate precipitation site 230. In some embodiments, the electrochemical system 200 may also include a preload 240.

In some embodiments, the electrochemical system 200 may include a housing 250 with an interior volume 260 and at least one electrode 270 within the interior volume 260. The housing 250 may also have at least one mechanism to control at least one detrimental ionic species in the interior volume. The detrimental ionic species may be present when the electrolyte 210 is added to the housing and into the interior volume.

Mechanisms to control the at least one detrimental ionic species may include a chelating agent 220, a preload 240, or a particulate precipitation site 230. In some embodiments, the mechanisms may include any combination of chelating agents 220, preloads 240, and particulate precipitation sites 230. At least one chelating agent 220 may be added to the interior volume 260 in some embodiments. In some embodiments, a preload 240 may be included in the interior volume 260. In some embodiments, a particulate precipitation site 230 may also be present in the interior volume 260. In some embodiments, a preload 240 is a particulate precipitation site 230. In some embodiments, the particulate precipitation site 230 is a nucleation site. In some embodiments, the particulate precipitation site 230 comprises a plurality of suspended solid particles.

In some embodiments, the electrochemical system 200 may be a metal-water system. In some embodiments, the electrochemical system 200 may be a metal-oxygen system. In some embodiments, the system 200 may be surrounded by an environment comprising a liquid 290. For example, in some embodiments, the system may be at least partially submerged in a liquid containing water, such as brackish water, seawater, fresh water, or deionized water. In some embodiments, the system may be fully submerged in an aqueous environment 290. In some embodiments, the system may be submerged in an environment comprising oxygen.

In some embodiments, the system 200 may use an oxygen-based electrolyte 210. In some embodiments, the system may use an aqueous electrolyte 210. In some embodiments, the aqueous electrolyte 210 may include at least one of potassium hydroxide, sodium hydroxide, lithium hydroxide, seawater, fresh water, brackish water, or any combination thereof. The electrolyte 210 may be the same as the surrounding environment 290 of the electrochemical system 200. For example, in some embodiments, the electrochemical system 200 may be surrounded by seawater 290 and the electrochemical system 200 may use the seawater within the interior volume as an electrolyte 210.

In some embodiments, the electrolyte 210 may have at least one detrimental ionic species. For example, in some embodiments, the at least one detrimental ionic species may comprise at least one of $Ca^{2+}$, $Mg^{2+}$, $Fe^{2+}$, or $Fe^{3+}$. The detrimental ionic species may reduce the current output of the system because the electrode surface 270 may be affected, and metal byproduct may build up in the cell without enough precipitation to offset it. In some embodiments, the detrimental ionic species may foul the electrode 270, such as an aluminum anode, a lithium anode, a magnesium anode, a zinc anode, or an iron anode.

To reduce fouling and to ensure a more efficient electrochemical system, the system 200 may include at least one chelating agent 220 or preload 240 in the interior volume 260. In some embodiments, the chelating agent 220 is configured to selectively coordinate at least one dissolved species in the aqueous electrolyte 210. In some embodiments, the chelating agent 220 may act as a corrosion inhibitor for an anode 270 in the electrochemical system 200. In some embodiments, as described in further detail below, the chelating agents 220 and preloads 240 may be selected based on at least one of the type of electrode 270, the type of electrolyte 210, and the type of expected detrimental ionic species in the electrolyte 210 or surrounding environment 290.

In some embodiments, the electrochemical system 200 may include a preload 240 or particulate precipitation site 230. The particulate precipitation site 230 may be a site to collect the precipitate or to accelerate the precipitation process in the electrolyte 210. In some embodiments, the particulate precipitation site 230 may be a nucleation site. In some embodiments, the particulate precipitation site 230 is suspended in the aqueous electrolyte 210. In some embodiments, the particulate precipitation site 230 is dissolved in the aqueous electrolyte 210. In some embodiments, the particulate precipitation site 230 may include aluminum hydroxide, silicon dioxide, aluminum oxide, aluminum oxyhydroxide, Boehmite, sodium aluminate, calcium oxide, aluminum potassium sulfate, aluminum ammonium sulfate, dissolved aluminum species, or any combination thereof. In some embodiments, as described in further detail below, the particulate precipitation sites 230 may be selected based on at least one of the type of electrode 270, the type of electrolyte 210, and the type of expected detrimental ionic species in the electrolyte 210 or surrounding environment 290.

In some embodiments, the preloads 240 are precipitation sites 230. In some embodiments, a particulate precipitation site 230 is a solid particulate site. In some embodiments, a preload 240 may be either a solid particulate precipitation site or a dissolved species.

FIG. 3 shows a table of preload candidates in accordance with various embodiments. In some embodiments, the preload candidates may be used for aluminum hydroxide deposition. In some embodiments, the preload candidates may be added to the electrolyte in different phases. For example, some species may be added as a crystalline solid in some embodiments. In some embodiments, some species may be added in an amorphous phase. In some embodiments, the species may be added as a salt, a synthetic solid, a natural solid, or any combination thereof.

In some embodiments, the preload candidates may be seed particles. In some embodiments, the efficacy of preloading the electrolyte with seed particles to shorten the induction period depended on three factors: the composition of the seed particles and their solubility in the electrolyte; the surface area of the seed particles in the electrolyte, and the crystalline structure or phase of the seed particles. In some embodiments, the preload candidates may be a layered double hydroxide (LDH).

In some embodiments, particles with low solubility in electrolyte may have a greater impact on shortening the induction period of the system than particles with high solubility. For example, the three aluminum [oxy-]hydroxide species of boehmite, bayerite, and gibbsite have decreasing solubility in alkaline solutions. While little impact was observed for boehmite and bayerite additives, the introduction of gibbsite resulted in a smaller power drop and a faster recovery out of the transitional period, as shown in FIG. 4. In some embodiments, the steady-state power may be influenced by controlling which aluminum hydroxide phase is formed after the induction period. For example, if the precipitation is pushed to a phase with faster growth kinetics, then the removal rate of aluminate is increased, more hydroxide is freed up, and the cell operates at a higher current density in some embodiments.

Figure 4A:
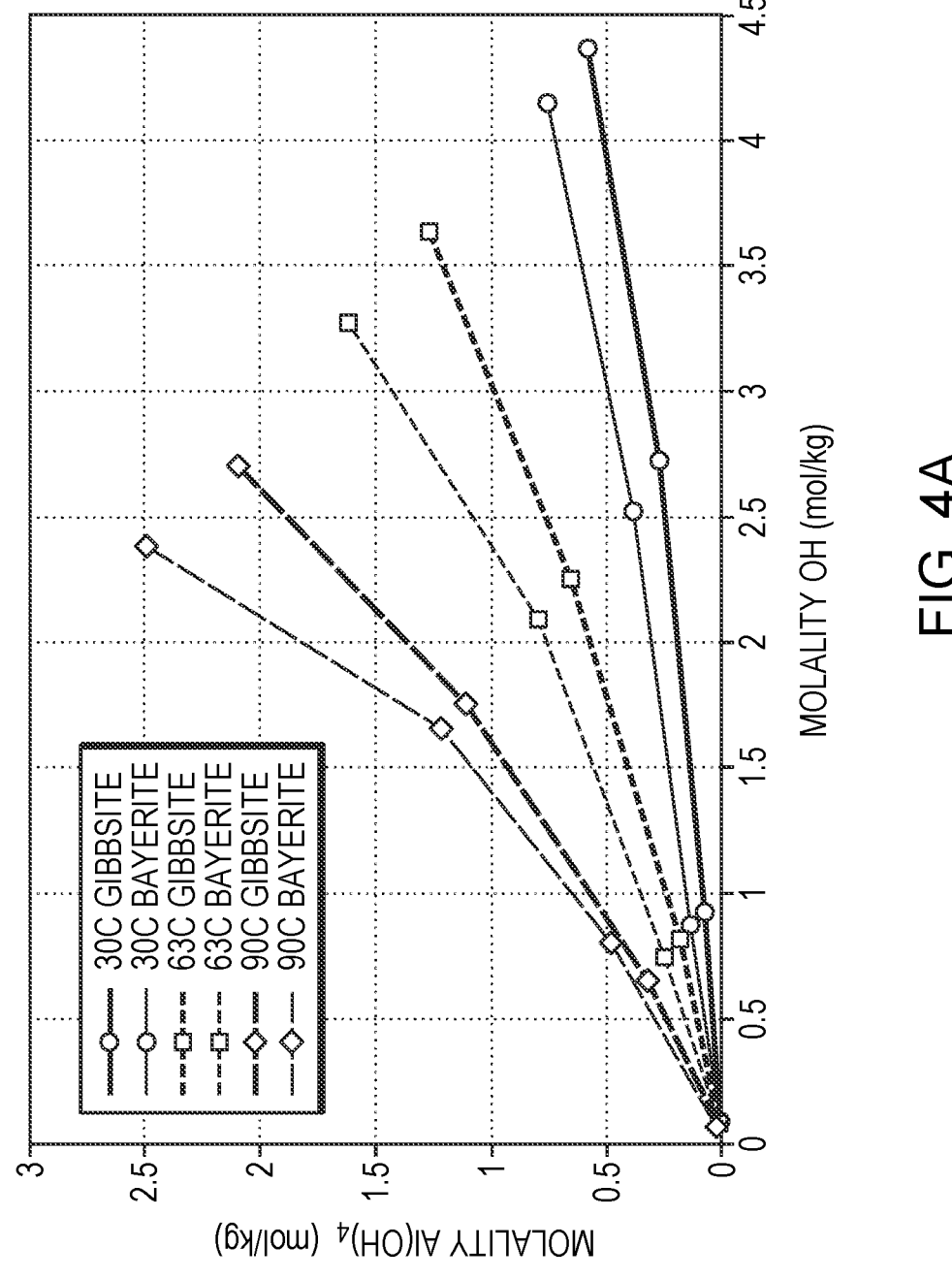
FIG. 4A shows a graph of equilibrium aluminate and hydroxyl concentrations as a function of temperature for aluminum hydroxide-based preload species in accordance with one embodiment.

FIGS. 4A and B show graphs of preload species solubility and the electrochemical cell performance as a function of preload species in the electrolyte cell in accordance with one embodiment.

Figure 4B:
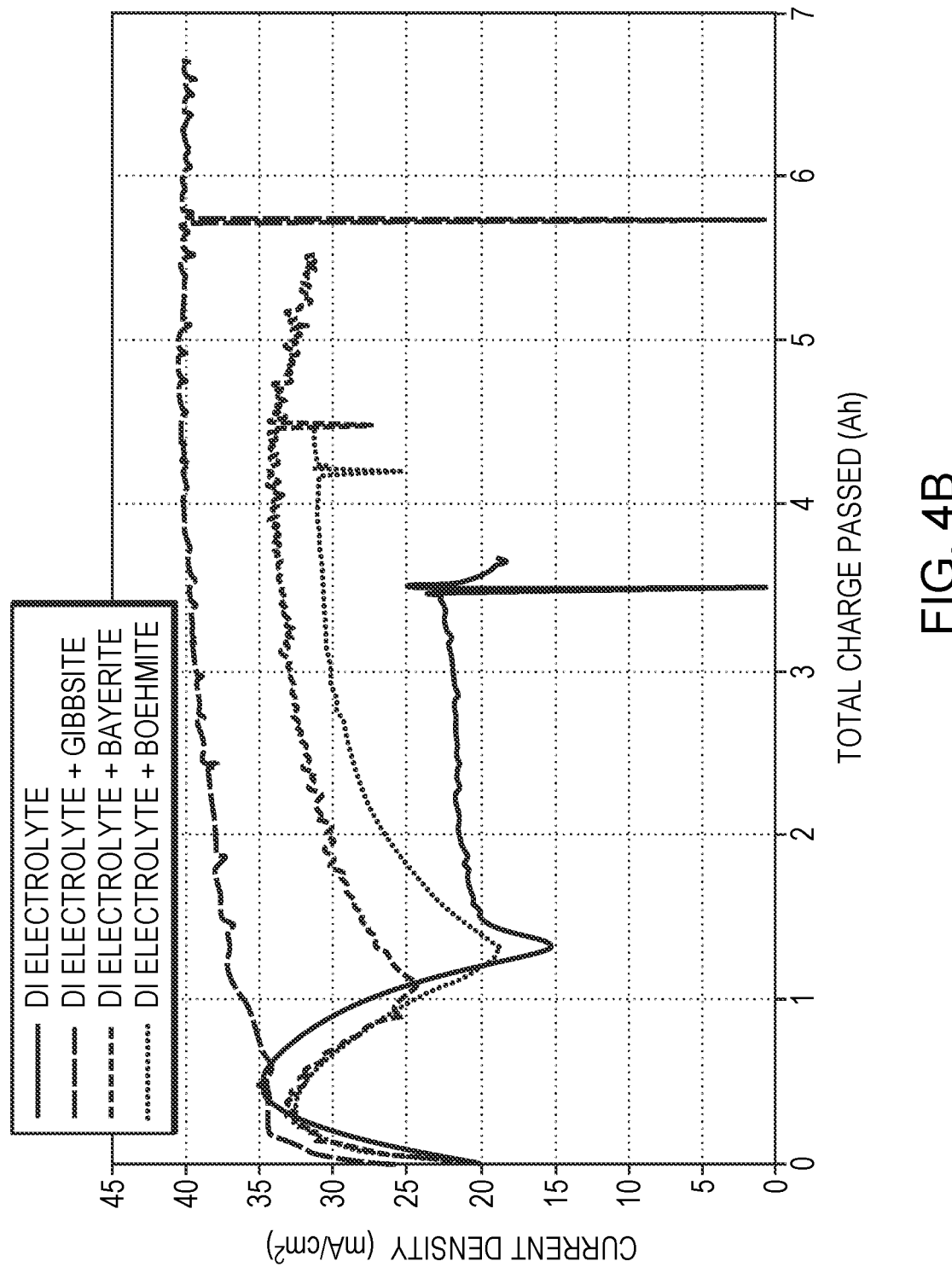
FIG. 4B shows a graph of electrochemical cell performance as a function of aluminum hydroxide-based preload species in the electrolyte cell in accordance with one embodiment.

In some embodiments, seed particles with a high specific surface area, corresponding to particles with a high surface area to volume ratio, were effective at dampening the induction period. The greater the surface area, the greater efficacy of preloading the electrolyte in some embodiments. In FIG. 4, both the 90C Gibbsite line and the 63C Gibbsite line correspond to the same quantity of added gibbsite in the electrolyte, but the 90C Gibb site line corresponds to a smaller particle size than that of the 63C Gibbsite line. The transition trough in FIG. 4B of the DI electrolyte with gibbsite is fully dampened such that the discharge approaches a steady state discharge with no transitional trough period. This is a function of the number of active sites on the seed particles, which scales linearly with increasing surface area. In some embodiments, the absolute surface area of all particles in solution can be increased by using a greater quantity of smaller particles.

For identically designed electrochemical cells run at the same temperature, a similar transition trough may be observed at approximately 1-2 A hr into the discharge. As shown in FIG. 4B, very soluble species such as boehmite did not significantly affect the trough. The addition of moderately soluble bayerite resulted in the minimum current output occurring at 1.0 Ahr instead of 1.2 Ahr, and the current density was closer to 25 mA/cm$^2$ instead of under 20 mA/cm$^2$. Addition of gibbsite, the least soluble aluminum hydroxide species, resulted in a dampened trough around 35 mA/cm$^2$. Kinetically, the most favored state for the precipitation reaction is gibbsite of the embodiment shown in FIG. 4B, which may contribute to the accelerated rate of aluminate precipitation, decreasing its concentration in solution and increasing current output in some embodiments. In some embodiments, the time to fully dissolve the particles varies widely between the species. In some embodiments, dissolution does not have an effect over the time scale of the battery discharge.

Moreover, the crystalline phase of the preload seed particles is an important factor in some embodiments, as the experimental conditions of precipitation have an impact on both the thermodynamically preferred and kinetically preferred states of the aluminum hydroxide byproduct.

Figure 5:
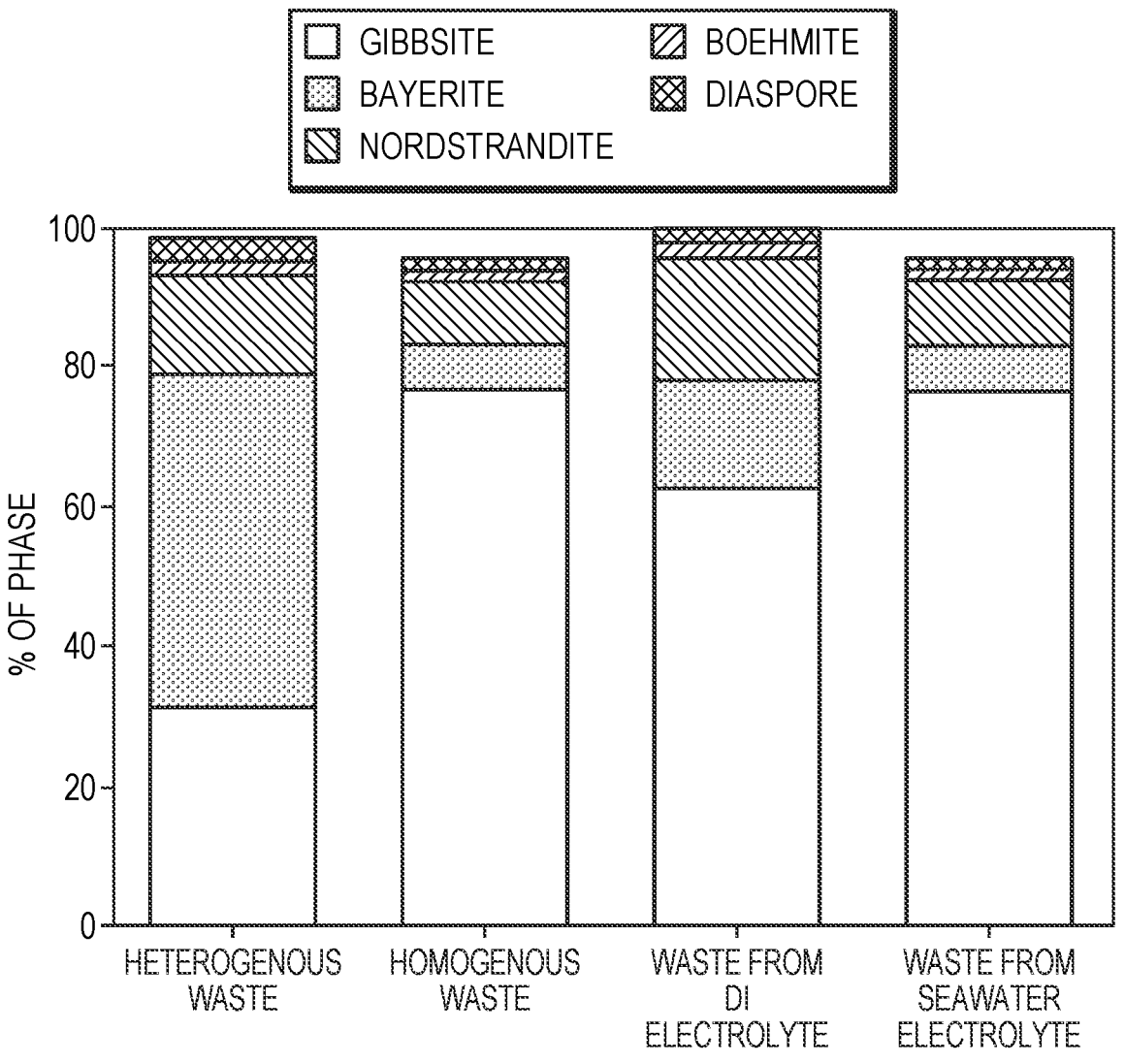
FIG. 5 shows the relative phase composition of precipitated aluminum hydroxide as a function of electrolyte composition in accordance with one embodiment.

FIG. 5 shows a composition of precipitated aluminum hydroxide as a function of electrolyte composition in accordance with one embodiment. Under the conditions that aluminum-water batteries are discharged at in some embodiments, gibbsite is the thermodynamically favored phase for aluminum hydroxide. Kinetically, the first aluminum hydroxide product that forms at cool temperatures, between 0 and 25° C., at atmospheric pressures, and with no additional salts or ionic species present is bayerite. Bayerite growth is also observed on other surfaces in the electrochemical system ("heterogeneous waste"). However, in some embodiments, the waste product can form different phases based on the underlying crystalline structure of the seed particle. For example, at temperatures greater than 25° C. and at pH values greater than 14, the primary phase of the aluminum hydroxide precipitate is gibbsite. The presence of seawater salts and other insoluble particles, such as calcium and magnesium hydroxide that form when seawater mixes with potassium hydroxide, may also cause the kinetically favored precipitation state to be gibbsite in some embodiments. As shown in FIG. 5, the waste from DI water-based electrolytes contained approximately 60% gibbsite and the waste from seawater-based electrolytes contained approximately 75% gibbsite. FIG. 5 also shows a greater degree of amorphous (non-crystalline) waste present as well in seawater-based electrolytes, causing the percentages to not add up to 100%.

The presence of certain ionic species may have a detrimental impact on the cell performance, which is a unique challenge faced when the electrolytes for electrochemical cells are formed from environmental sources of water. These sources can include but are not limited to seawater, brackish (marsh or bog) water, agricultural runoff or other forms of wastewater, or other "natural" sources. One common technique employed to bind ionic species is chelation, a chemical reaction where usually organic compounds are used to bind metal ions in solution.

Figure 6:
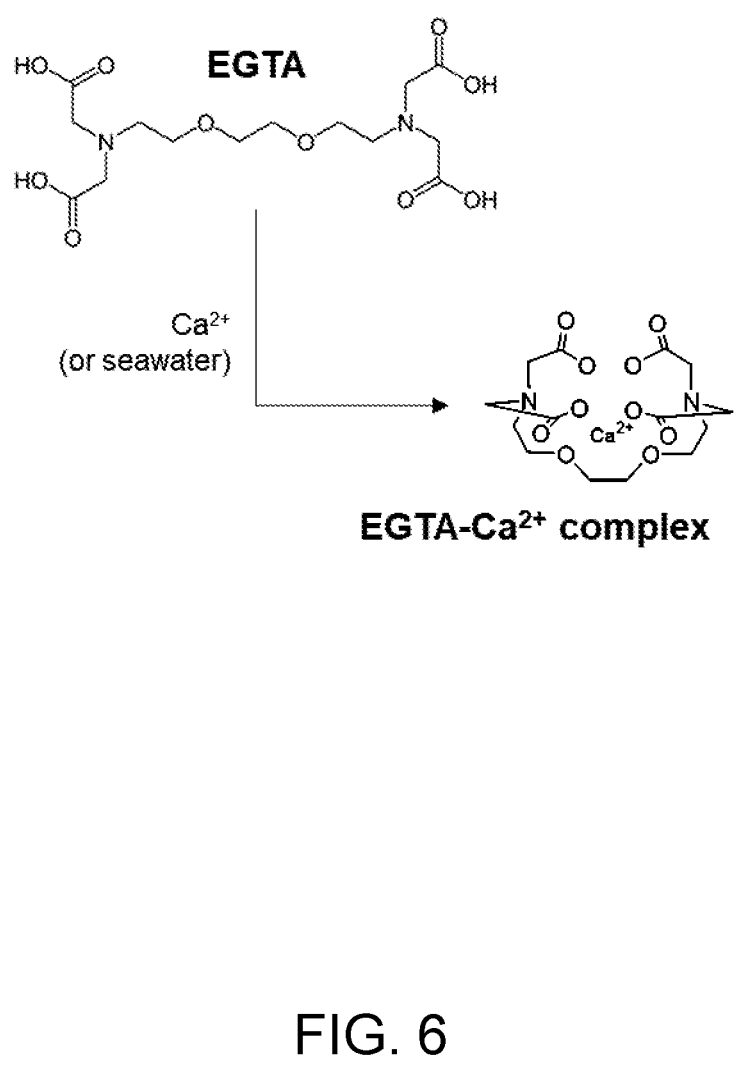

FIG. 6 shows a chelating agent complexing with Ca$^{2+}$ in accordance with one embodiment. Some embodiments may use specific Ca$^{2+}$-binding and Fe$^{3+}$-binding chelating agents in a naturally sourced aqueous electrolyte for an electrochemical cell. Some embodiments may use chelating agents that can be dissolved in an aqueous electrolyte. Some embodiments may use agents that cannot be dissolved in an aqueous electrolyte. For example, flowing the electrolyte over a chelating agent or an ion-exchange resin fixed in a single process unit and then injected into the electrochemical cell may accomplish the same purpose in some embodiments. By complexing with Ca$^{2+}$ in solution, the cationic species is unable to continue reacting and fouling the cell and is unable to inhibit the formation of a metal-hydroxide byproduct.

For aluminum-water cells, cationic species such as Ca$^{2+}$, Sr$^{2+}$, and Fe$^{3+}$ present in the electrolyte can impact the electrochemistry through different, species-dependent mechanisms. Two predominant mechanisms occur with these species: 1) fouling on either of the electrode surfaces which prevents either of the half-reactions from occurring; and/or 2) inhibiting the formation of the aluminum hydroxide byproduct, which binds up hydroxide and reduces the current output of the electrochemical cell.

More specifically, the detrimental effects of $Fe^{3+}$ ions are caused by the first mechanism. In some embodiments, $Fe^{3+}$ may promote the $H_2$ evolution reaction to occur at the anode, which may reduce the coulombic efficiency and cause the cell output to decrease. The presence of $Ca^{2+}$ and $Sr^{2+}$ ions may cause the latter mechanism to occur, which has two impacts on the electrochemistry. The divalent cations inhibit the formation of the aluminum hydroxide byproduct, and secondly can increase the thickness of the double-hydroxyl layer on the anode surface. Both effects reduce the current output of a cell by preventing the transport of hydroxide ions to the anode. Both effects may be cured by the introduction of chelators, such as the one shown in FIG. 6. In some embodiments, a system may use a plurality of chelators specific to the detrimental ions in the electrolyte.

Figure 7:
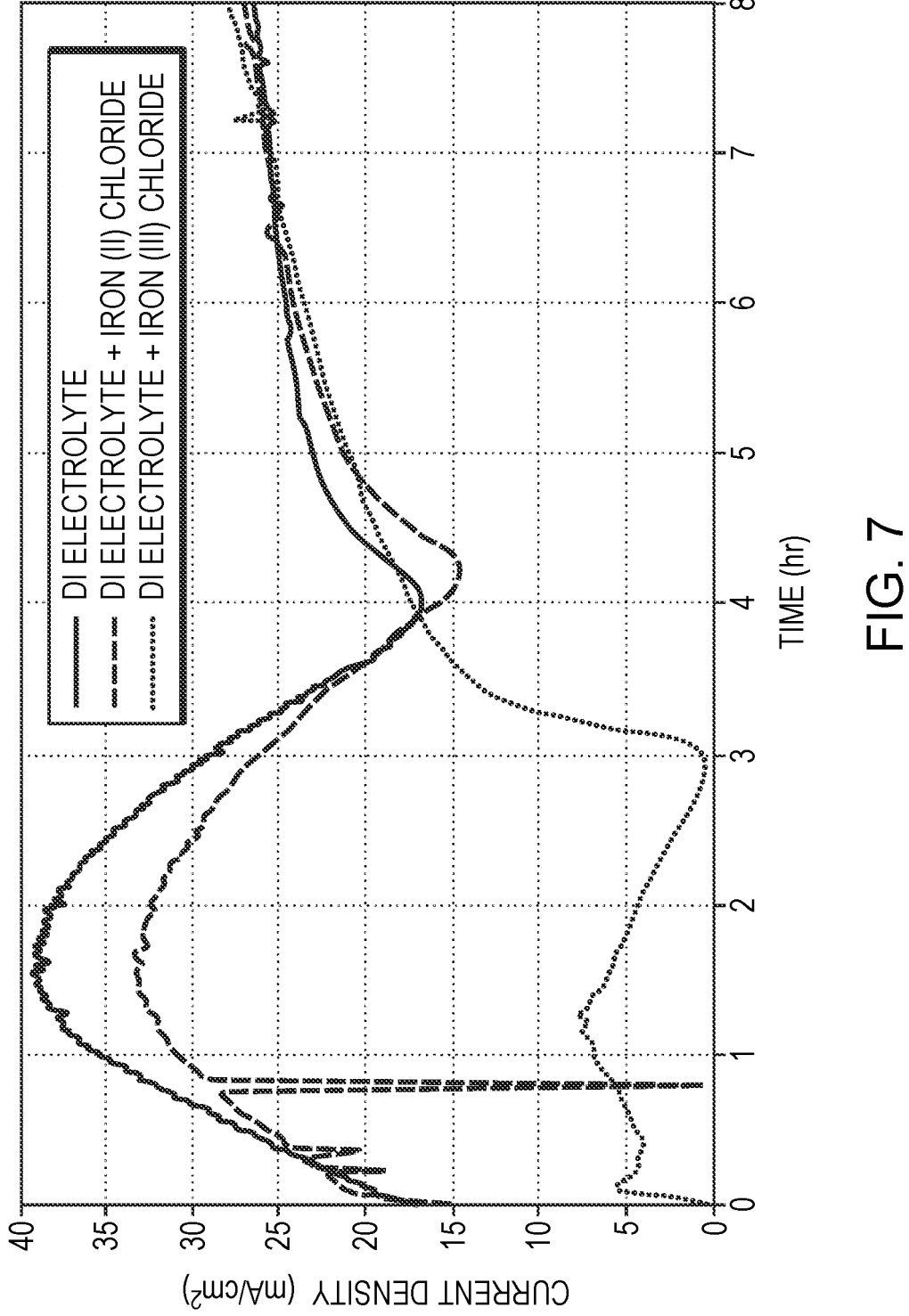
FIG. 7 shows aluminum-water electrochemical cell discharges in electrolytes formed from KOH and deionized ("DI") water with various iron additions in accordance with one embodiment.

FIG. 7 shows aluminum-water electrochemical cell discharges in electrolytes formed from KOH and DI water with various iron additions in accordance with one embodiment. In some embodiments, as shown in FIG. 6, $Fe^{3+}$ may interact adversely with the cell to cause coulombic efficiency and the current output of the cell to decrease. As shown, the addition of $Fe^{2+}$ resulted in a temporary drop of current density. In some embodiments, the presence of $Fe^{3+}$ resulted in a temporary decrease in coulombic efficiency. In some embodiments, the water is being reduced via $Fe^{3+}$ at the aluminum anode, causing a short in which the current output or self-corrosion is not visible in the graph shown in FIG. 7.

Once the $Fe^{3+}$ is fully consumed, the cell may recover to a similar current output to the non-Fe-poisoned case. For example, looking at $Fe(III)Cl_3$, the output peaks around 5-8 mA/cm$^2$, while the electrolyte in deionized water peaks at around 40 mA/cm$^2$.

Figure 8:
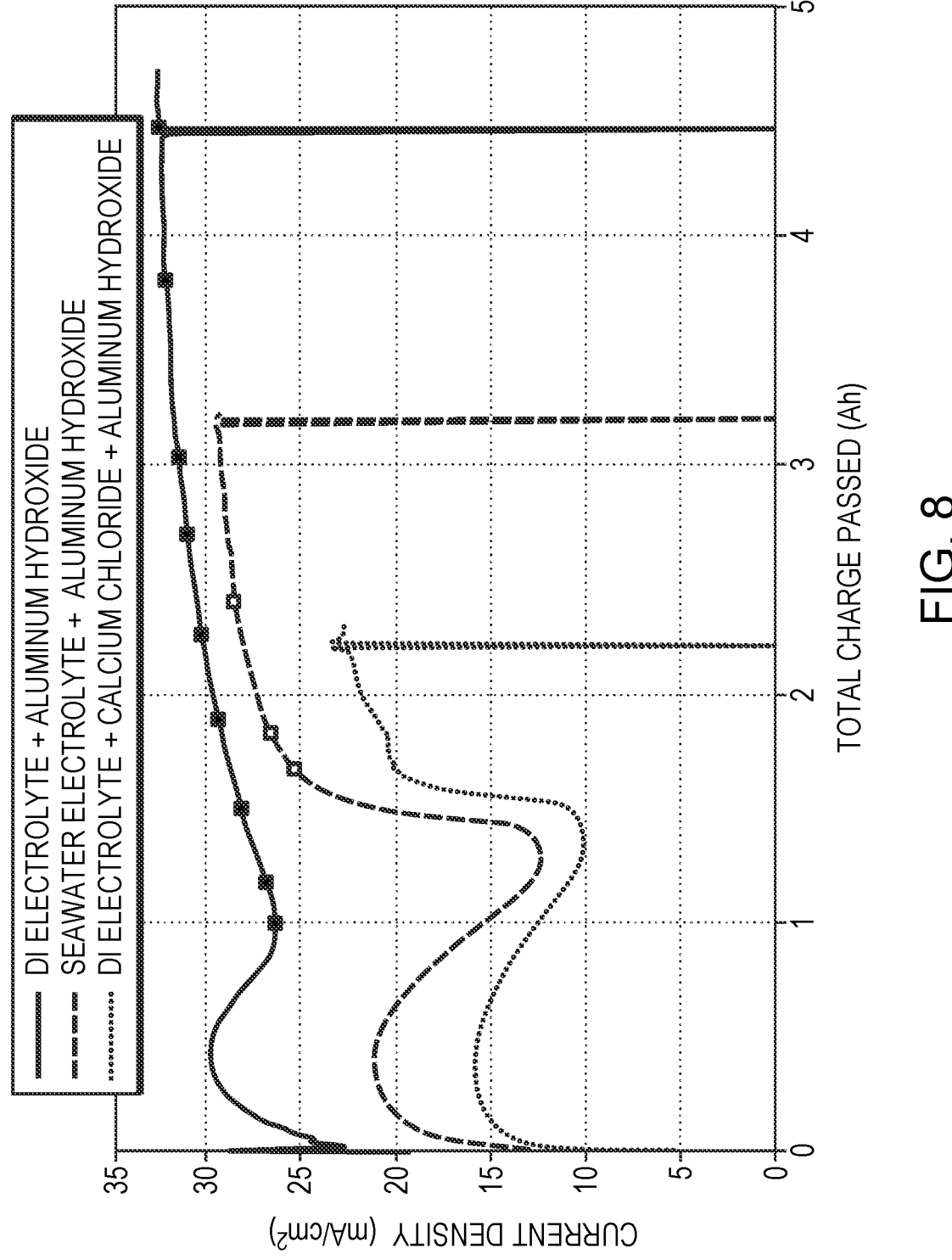
FIG. 8 shows aluminum-water electrochemical cell discharges in electrolytes formed from KOH and seawater or KOH and DI water with various calcium additions in accordance with one embodiment.

In some embodiments, the presence of certain ions, such as $Ca^{2+}$ (and by extension $Sr^{2+}$) ions, may greatly reduce the effect of the preloading scheme. FIG. 8 shows aluminum-water electrochemical cell discharges in electrolytes formed from seawater and DI water with KOH, $Al(OH)_3$ and various calcium additions in accordance with one embodiment. The graph shows the total charges passed in electrolytes formed from DI water with KOH and $Al(OH)_3$ (solid line), seawater with KOH and $Al(OH)_3$ preload added (dashed line), and DI water with KOH, $Al(OH)_3$ preload and $Ca^{2+}$ added (dotted line). In some embodiments, the combination of DI water with an electrolyte and aluminum hydroxide results in a greater total charge passed than the seawater electrolyte combined with aluminum hydroxide. Both of these combinations result in a greater total charge passed than the combination of DI water with aluminum hydroxide and calcium chloride. As shown in FIG. 8, as the solution becomes saturated with aluminate, there is less of a decrease in current density in the combination of DI water with an electrolyte and aluminum hydroxide than when $Ca^{2+}$ is added.

Figure 9:
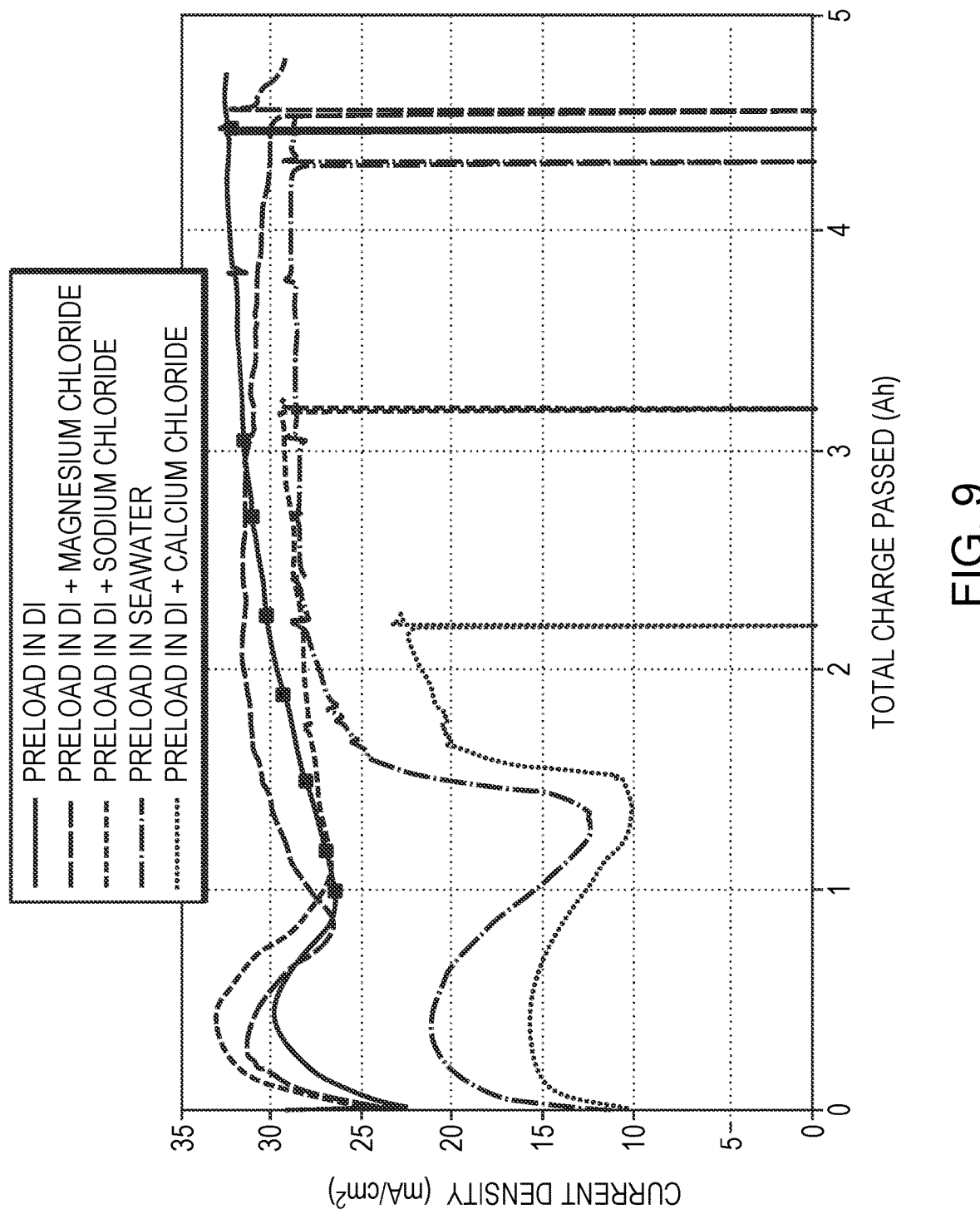
FIG. 9 shows aluminum-water electrochemical cell discharges in DI and seawater electrolytes, with added preload and varying added salts, as a function of the total charge passed through the cell in accordance with one embodiment.

FIG. 9 shows aluminum-water electrochemical cell discharges in DI water and seawater electrolytes, with added $Al(OH)_3$ preload and varying added salts, as a function of the total charge passed through the cell in accordance with one embodiment. As shown, the average current density for preload-containing electrolytes composed using DI water, DI water and $MgCl_2$, and DI water and NaCl is higher than the average current density for preload-containing electrolytes composed of seawater or DI water and $CaCl_2$. In other words, the transition trough is reduced for preload-containing electrolytes that do not contain calcium ions.

FIGS. 10A, 10B and 10C show three tables of chelator candidates investigated in accordance with one embodiment. A plurality of chemical chelators may be used in electrochemical systems to make the systems more efficient. Some embodiments may use chelators specific to $Ca^{2+}$, chelators that bind cations generally, or soluble salts that form insoluble calcium or other metal products which precipitate out of solution. In some embodiments, a plurality of chelators may be chosen in light of at least one of the environment, specific to the electrolyte, or specific to the electrodes. For example, if a large amount of calcium ions were expected to be present in the electrolyte, the system may include a chelator configured to bind to $Ca^{2+}$. In some embodiments, the system may include a plurality of chelators. In some embodiments, if a large amount of iron and calcium ions were expected to be present in the electrolyte, the system may include a chelator configured to bind to at least one of $Fe^{3+}$ and $Ca^{2+}$, a chelator that binds cations generally, or a plurality of chelators, wherein at least one of the plurality of chelators is configured to bind to $Fe^{3+}$ and another of the plurality of chelators is configured to bind to $Ca^{2+}$.

Experimentally, the impact of the chelators was measured by proxy with the pre-transition current and power density. When the detrimental species are removed from solution, the cell approaches a discharge profile similar to how it would perform with an electrolyte formed from deionized/distilled water. Most chelating species bind ions in a 1:1 molar ratio, so that was used as a basis to determine how much chelator to add. However, in some embodiments, the chelator concentration may not be exactly a 1:1 molar ratio. In some embodiments, the chelator concentration may be equal to the concentration of $Ca^{2+}$ in solution. In some embodiments, the chelator concentration may equal to the concentration of all divalent and trivalent cationic species in solution, including $Ca^{2+}$, $Mg^{2+}$, and $Fe^{3+}$. These comprise most of dissolved cationic species present in seawater except for monovalent cations such as $Na^+$ and $K^+$.

Not all chelator species have the same efficacy. Some embodiments may use different chelators, depending on the stability of chelator at high alkalinity, the ionic selectivity that favors divalent and trivalent cations over other species present, and the solubility of the target species in certain pH conditions. For example, some target species in alkaline solutions, as $Ca^{2+}$, $Mg^{2+}$, and $Sr^{2+}$ form solid metal hydroxides when exposed to strong bases. Under high pH conditions, the equilibrium favors precipitation although trace quantities of these species may remain in solution in some embodiments. In some embodiments, the consumption of the trace dissolved quantities may drive the equilibrium towards solubilizing the metal hydroxides (the metal represented as M in the schema below) and subsequently chelating the species (the chelator represented as Chl below):

$$M(OH)_{2(s)} \underset{eq.}{\rightleftharpoons} M^{2+}_{(aq)} + 2(OH)^-_{(aq)}$$

$$M^{2+}_{(aq)} + Chl_{(aq)} \rightarrow \left(ChlM^{2+}\right)_{aq}$$

Kinetically, this process may occur on the order of tens of minutes to hours, with significant improvement generally observed after a period of fifteen minutes. The performance for each chelator may vary in certain embodiments, with compounds containing multiple carboxylic acids and nitrile groups performing the best and those with fewer functional groups binding less effectively to metal ions. As the metal hydroxide solids transition into more crystalline forms, the dissolution kinetics may slow down, and the time period required to bind the metal ions increases in some embodiments.

Figure 11:
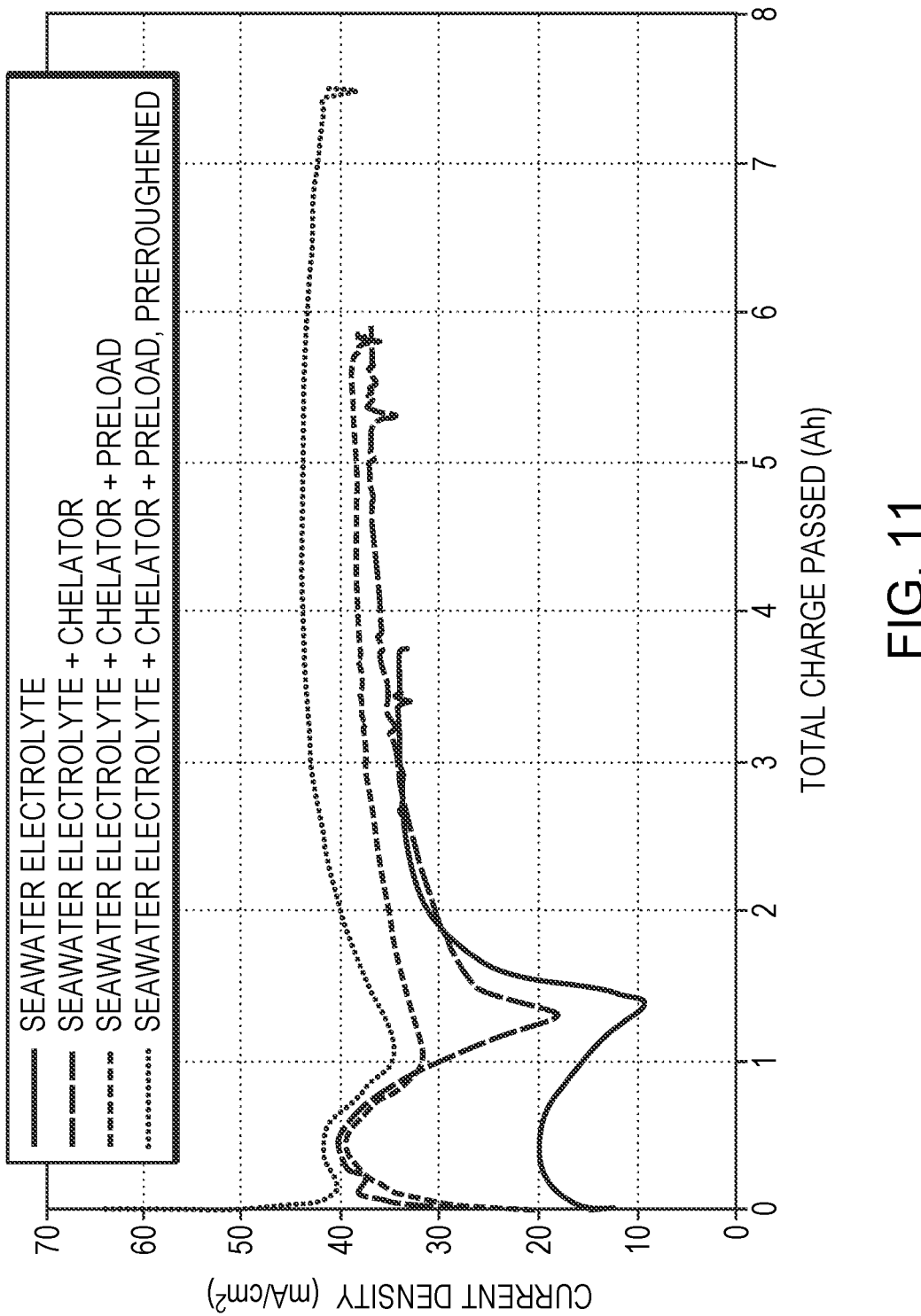
FIG. 11 shows aluminum-water electrochemical cell discharges with seawater electrolyte, under four conditions in accordance with one embodiment.

FIG. 11 shows aluminum-water electrochemical cell discharges with seawater electrolyte, under four conditions in accordance with one embodiment. These conditions are the addition of a seawater electrolyte; a seawater electrolyte and a chelator; a seawater electrolyte, a chelator, and a preload; and a seawater electrolyte, a preload, and a preroughened chelator.

In some embodiments, to preroughen a chelator, the chelator may be sandblasted. In some embodiments, the chelator may comprise $Ca^{2+}$. In some embodiments, a combination of an effective preload and appropriate chelating agent significantly dampened the induction period, accelerated the discharge to steady state, and generally improved the performance of aluminum-water electrochemical cells. As is shown in FIG. 11, the seawater electrolyte alone had a sizeable gap between the transition trough and the recovery point. However, the seawater electrolyte with the preload and chelator has a smaller difference in current density between the transition trough and recovery point. When the chelator is preroughened, the difference is also diminished significantly. Moreover, the time from the pre-transition peak to the recovery point is less with the chelator, preload, and seawater electrolyte than with just the seawater electrolyte or the seawater electrolyte and chelator alone.

Figure 12A:
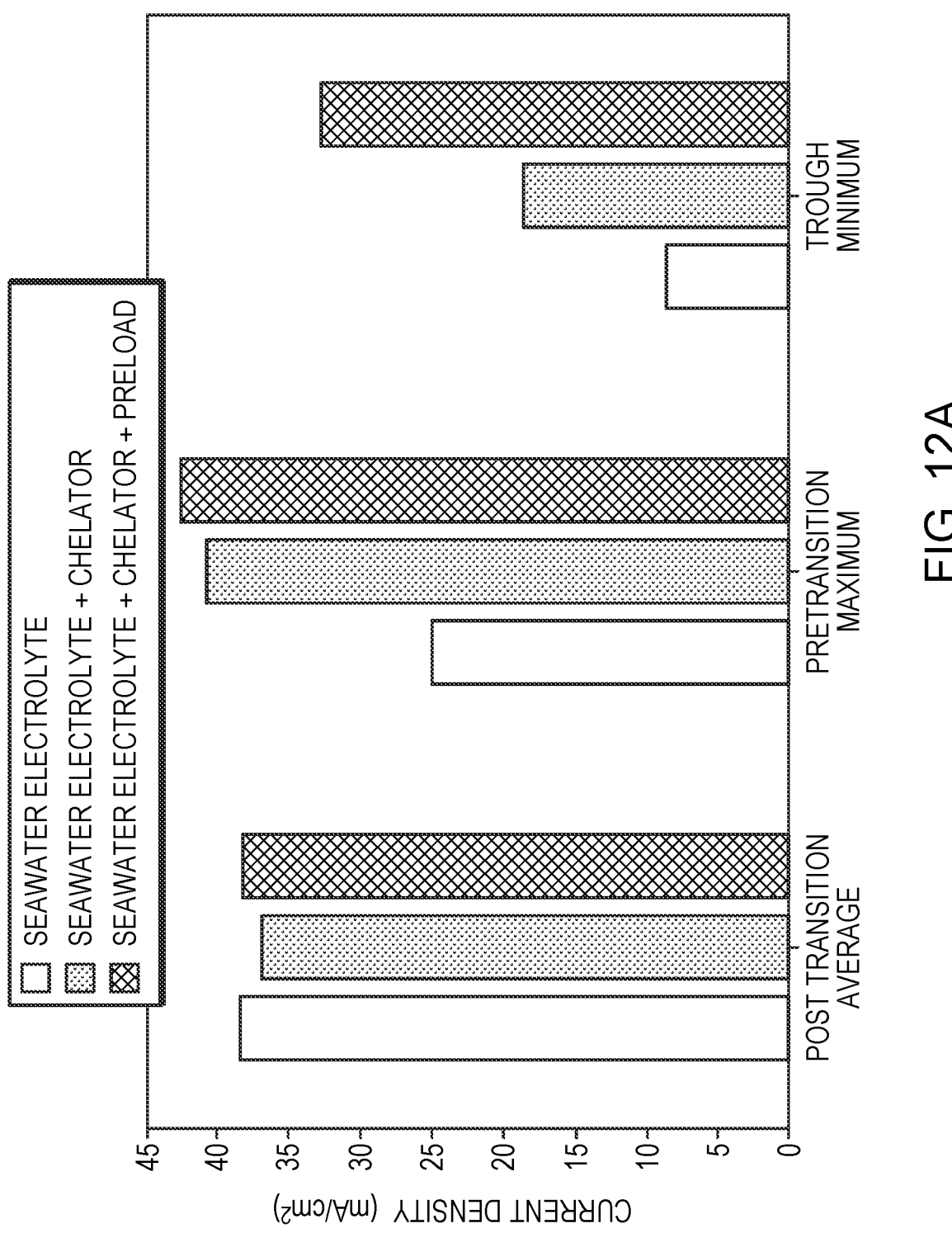
FIG. 12A shows a graph comparing the current density of electrolyte compositions at different stages of the electrochemical discharge process in accordance with one embodiment.
Figure 12B:
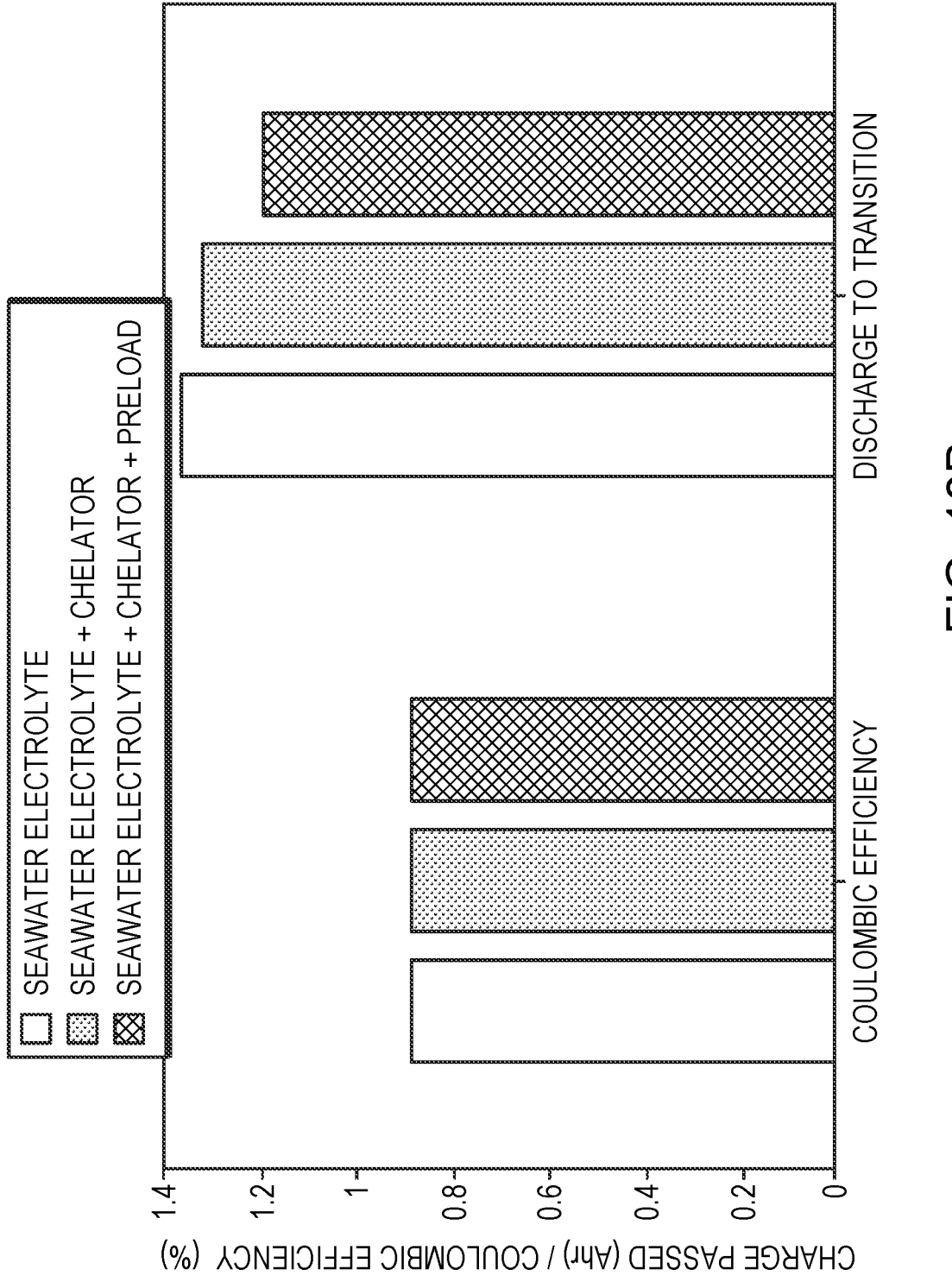
FIG. 12B shows a graph comparing the differences in charge passed per coulombic efficiency based on differing electrolyte compositions in accordance with one embodiment.

FIG. 12A shows a graph comparing of the current density of electrolyte compositions throughout the electrochemical discharge process in accordance with one embodiment. FIG. 12B shows a graph comparing the differences in charge passed per coulombic efficiency based on differing electrolyte compositions. These show a compilation of the experimental data collected on key performance metrics in electrochemical flow cell discharges with regards to electrolytes in seawater under three conditions: raw seawater electrolyte, seawater electrolyte with preload present, and seawater electrolyte with preload and chelator present.

In some embodiments, net, the introduction of a preload either alone or in combination with a chelator does not significantly impact the coulombic efficiency or the steady-state average current density of the cells. However, in some embodiments, the time to transition and maximum current density pre-transition and in the transitional trough are significantly improved. The ratio shows more stabilization in some embodiments, indicating that the preload either alone or in combination with a chelator shortens the induction period and allows the electrochemical system to reach the recovery point more quickly. For example, as shown in FIG. 12A, although the post transition average is relatively similar for all three conditions, the trough minimum is much higher for the seawater electrolyte with preload and chelator present than the raw seawater electrolyte. This indicates that, in some embodiments, adding the preloade and chelator create a more stable electrochemical system.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical system, the system comprising:
an aqueous electrolyte;
at least one chelating agent configured to bind to at least one detrimental ionic species;
a preload consisting of gibbsite and configured to act as a precipitation-inducing site; and
a particulate precipitation site, wherein the particulate precipitation site is capable of at least partial dissolution in the aqueous electrolyte, and wherein the particulate precipitation site is configured to act as a precipitation collection site, wherein the electrochemical system.

2. The electrochemical system of claim 1, wherein the particulate precipitation site comprises a plurality of suspended solid particles.

3. The electrochemical system of claim 1, wherein the electrochemical system is a metal-water system.

4. The electrochemical system of claim 1, wherein the electrochemical system is a metal-oxygen system.

5. The electrochemical system of claim 1, wherein the chelating agent is a corrosion inhibitor for an anode in the electrochemical system.

6. The electrochemical system of claim 1, wherein the particulate precipitation site comprises aluminum hydroxide, silicon dioxide, aluminum oxide, aluminum oxy-hydroxide, Boehmite, sodium aluminate, calcium oxide, aluminum potassium sulfate, aluminum ammonium sulfate, or dissolved aluminum species.

7. The electrochemical system of claim 1, wherein the chelating agent is configured to selectively coordinate at least one dissolved species in the aqueous electrolyte.

8. The electrochemical system of claim 1, wherein the aqueous electrolyte comprises at least one of potassium hydroxide, sodium hydroxide, lithium hydroxide, seawater, fresh water, brackish water, or any combination thereof.

9. The electrochemical system of claim 1, wherein the at least one detrimental ionic species comprises at least one of $Ca^{2+}$, $Mg^{2+}$, $Fe^{2+}$, or $Fe^{3+}$.

10. A method of forming an electrochemical system, the method comprising:
creating a housing with an interior volume;
placing at least one electrode within the interior volume;
adding, into the interior volume, at least one chelating agent configured to bind to at least one detrimental ionic species;
adding a preload to the interior volume, wherein the preload consists of gibbsite and is configured to act as a precipitation-inducing site; and
adding a particulate precipitation site to the interior volume, wherein the particulate precipitation site is capable of at least partial dissolution in an aqueous electrolyte, and wherein the particulate precipitation site is configured to act as a precipitation collection site.

11. The method of claim 10, further comprising adding an electrolyte to the interior volume.

12. The method of claim 11, wherein adding the electrolyte to the interior volume comprises at least partially submerging the housing into a water containing liquid.

13. The method of claim 10, wherein the particulate precipitation site comprises a plurality of suspended solid particles.

14. The method of claim 13, wherein the aqueous electrolyte comprises at least one of potassium hydroxide, sodium hydroxide, lithium hydroxide, seawater, fresh water, brackish water, or any combination thereof.

15. The method of claim 10, wherein the electrochemical system is a metal-water system.

16. The method of claim 10, wherein the chelating agent is a corrosion inhibitor for an anode in the electrochemical system.

17. The method of claim 10, wherein the chelating agent is configured to selectively coordinate at least one dissolved species in an aqueous electrolyte within the housing.

18. The method of claim 10, wherein the at least one detrimental ionic species comprises at least one of $Ca^{2+}$, $Mg^{2+}$, $Fe^{2+}$, or $Fe^{3+}$.

19. The method of claim 10, wherein the electrode comprises at least one of an aluminum anode, a lithium anode, a magnesium anode, a zinc anode, or an iron anode.

* * * * *